(12) United States Patent
Wilhelm

(10) Patent No.: US 11,800,853 B2
(45) Date of Patent: Oct. 31, 2023

(54) PET TOY

(71) Applicant: Doskocil Manufacturing Company, Inc., Arlington, TX (US)

(72) Inventor: Josiah Wilhelm, Fort Worth, TX (US)

(73) Assignee: DOSKOCIL MANUFACTURING COMPANY, INC., Arlington, TX (US)

( * ) Notice: Subject to any disclaimer, the term of this patent is extended or adjusted under 35 U.S.C. 154(b) by 68 days.

(21) Appl. No.: 17/151,820

(22) Filed: Jan. 19, 2021

(65) Prior Publication Data
US 2021/0259210 A1 Aug. 26, 2021

Related U.S. Application Data

(60) Provisional application No. 62/980,611, filed on Feb. 24, 2020.

(51) Int. Cl.
*A01K 15/02* (2006.01)

(52) U.S. Cl.
CPC .................. *A01K 15/025* (2013.01)

(58) Field of Classification Search
CPC .... A01K 15/025; A01K 15/026; A01K 5/024; A01K 31/06; A01K 39/00; A01K 5/015; A63H 33/18; A63H 33/02; A63H 33/006; A63H 33/00; B60B 33/0042; A61J 17/02; A61J 11/0055

USPC ........ 446/453, 227; 119/707, 709, 702, 531, 119/477, 132; D30/160

See application file for complete search history.

(56) References Cited

U.S. PATENT DOCUMENTS

| 6,468,123 B1 * | 10/2002 | Valencia ................. | A63H 33/18 |
| | | | 473/588 |
| 2007/0062459 A1 * | 3/2007 | Costello ............... | A01K 15/026 |
| | | | 119/707 |
| 2012/0152180 A1 * | 6/2012 | McCann .............. | A01K 15/025 |
| | | | 119/707 |
| 2015/0224378 A1 * | 8/2015 | Ruyssenaars ............. | A63F 9/02 |
| | | | 473/514 |
| 2019/0001236 A1 * | 1/2019 | Miller .................... | A63H 33/18 |

* cited by examiner

*Primary Examiner* — Peter M Poon
*Assistant Examiner* — Jeffrey R Larsen
(74) *Attorney, Agent, or Firm* — GLOBAL IP COUNSELORS, LLP

(57) ABSTRACT

A pet toy includes a first ring section and a second ring section. The first ring section includes a first body with an outer peripheral surface, and a connector. The first body is rigid and includes a groove. The second ring section includes a second body connected to the first body by the connector. The second body is at least partially elastic and sized and configured to be removably positioned within at least a portion of the groove.

18 Claims, 8 Drawing Sheets

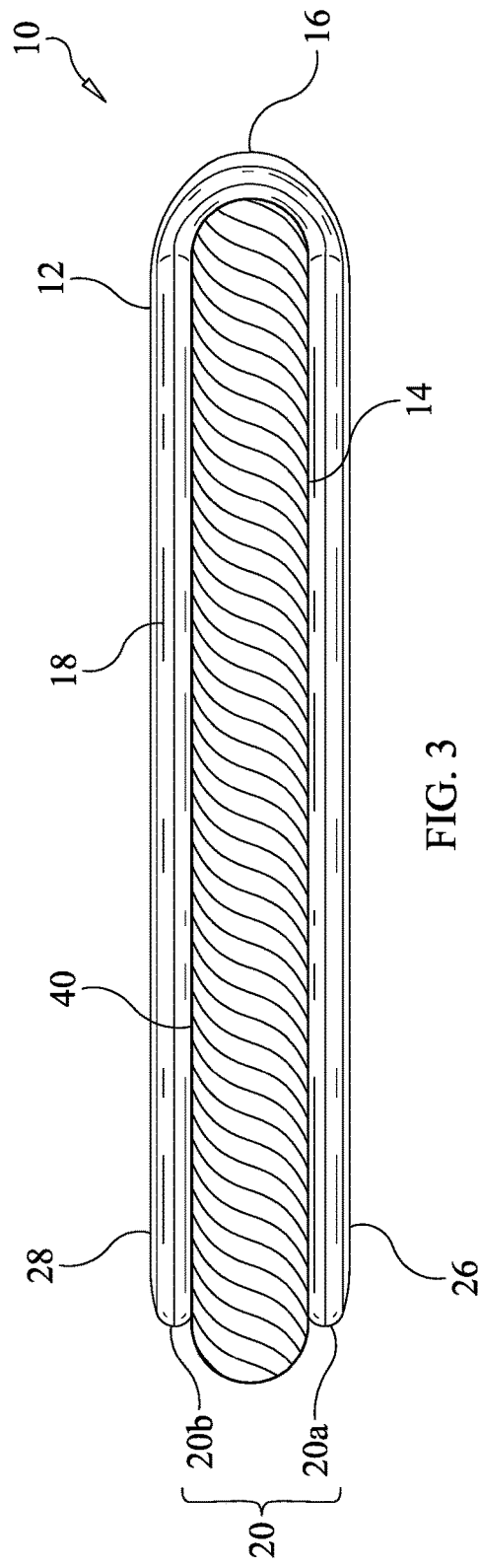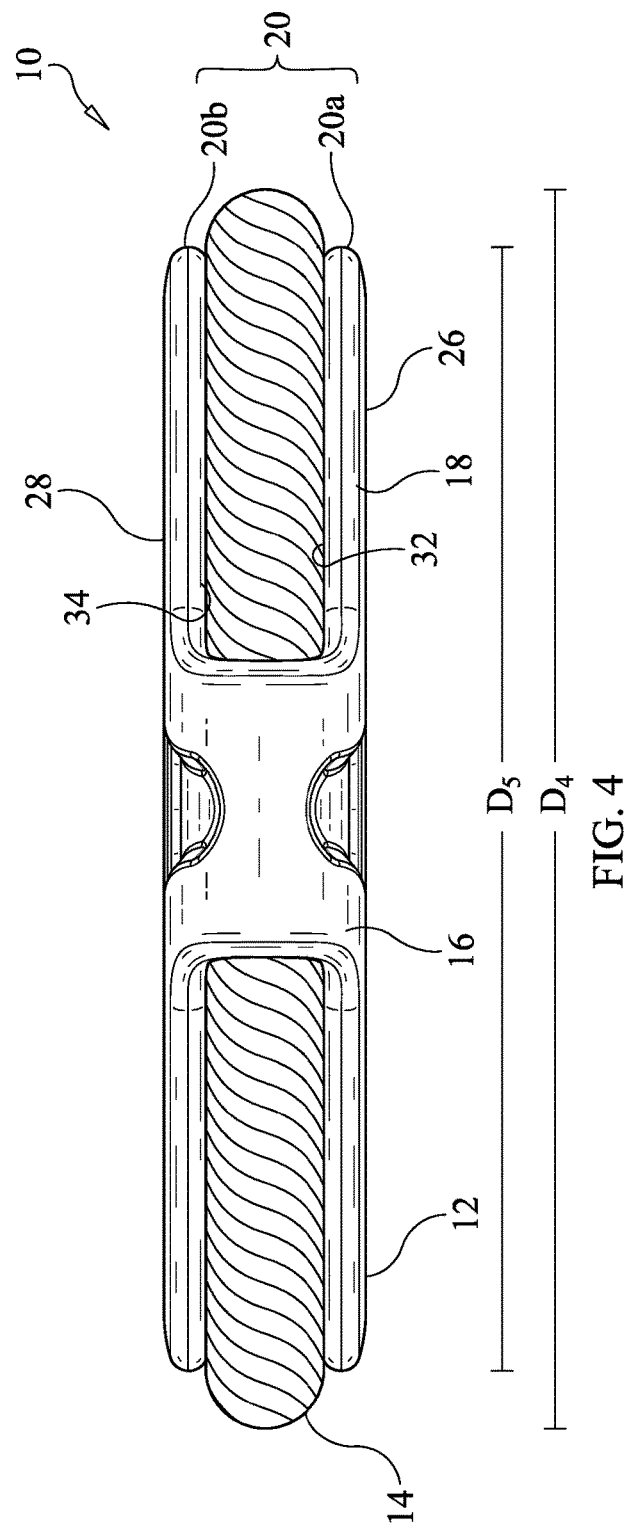
FIG. 3
FIG. 4

PET TOY

RELATED APPLICATIONS

This application claims priority to U.S. Provisional Patent Application No. 62/980,611 filed on Feb. 24, 2020, which is hereby incorporated herein by reference.

BACKGROUND

Field of the Invention

The present disclosure relates to a pet toy with multiple configurations. More particularly, the present disclosure relates to a pet toy with a first section and a second section that are connectable to form multiple pet toy configurations.

Background Art

There are many types of conventional pet toys that provide various play conditions for a pet. For example, some pet toys roll on the ground or can be thrown through the air. Other pet toys enable the pet to chew on the toy or enable the pet to pull against the toy in the user's grip. Many of these toys are configured to allow only a single manner in which users and pets can play.

SUMMARY

It has been discovered that an improved pet toy that enables a user and a pet to enjoy a variety of play options is desired. In particular, it has been discovered that pet owners or others desire to have a single toy that enables the user to play with their pets in a variety of different ways based on the configuration of the pet toy.

Because many pet toys are limited to one style or manner of play, users may spend less time at play with their pets or find themselves taking multiple pet toys to the play area to allow multiple options of play. Lower time of play can be detrimental to users and pets alike because it leads to less active exercise time. Taking multiple pet toys to the play area increases the chance that the user or pet will end up losing one of the pet toys or will overplay or underplay with the pet based on the variety (or lack of variety) of toys. Therefore, a pet toy that satisfies multiple play options will enable a user to bring a single toy to a play area, enable proper play time, and reduce the possibility of losing track of toys.

Additionally, it has been discovered that retail stores have limited space for all items, including pet toys. Retail stores must choose which pet toys to display and the limited space may create a lower number of toy and play options. Therefore, a pet toy that satisfies multiple play options will enable a retailer to carry one toy that can be used for multiple activities.

Further, many users complain about a lack of durability of conventional pet toys which undergo a great deal of stress, especially chewing and pulling toys. Therefore, a pet toy that is resilient can improve the durability of the toy and last longer.

The embodiments of the pet toy described herein satisfy the issues discovered with conventional pet toys and result in an improved multi-play pet toy. In view of the state of the known technology, one aspect of the present disclosure is to provide a pet toy that includes a first ring section and a second ring section. The first ring section includes a first body with an outer peripheral surface and a connector. The first body is rigid and includes a groove. The second ring section includes a second body connected to the first body by the connector. The second body is at least partially elastic and sized and configured to be removably positioned within at least a portion of the groove.

A second aspect of the present disclosure is to provide a pet toy according to the first aspect wherein the first body has a toroidal shape.

A third aspect of the present disclosure is to provide a pet toy according to any of the preceding aspects, wherein the connector of the first ring section is configured to enable the second ring section to be at least partially removed from the groove while being connected to the first ring section.

A fourth aspect of the present disclosure is to provide a pet toy according to any of the preceding aspects, wherein the second body is formed from a rope so as to be pliable.

A fifth aspect of the present disclosure is to provide a pet toy according to any of the preceding aspects, wherein the connector is integral with the first body and forms a through passage for the second body.

A sixth aspect of the present disclosure is to provide a pet toy according to any of the preceding aspects, wherein the groove is formed by first and second sides, and the connector is attached to the first and second sides.

A seventh aspect of the present disclosure is to provide a pet toy according to any of the preceding aspects, wherein the first body includes an inner radial surface configured to couple to a throwing device.

An eighth aspect of the present disclosure is to provide a pet toy according to any of the preceding aspects, wherein the inner radial surface is arcuate.

A ninth aspect of the present disclosure is to provide a pet toy according to any of the preceding aspects, wherein an outer diameter of the groove is substantially the same as an inner diameter of the second body.

A tenth aspect of the present disclosure is to provide a pet toy according to any of the preceding aspects, wherein the second body is configured to be held in the groove by a friction fit.

An eleventh aspect of the present disclosure is to provide a pet toy according to any of the preceding aspects, wherein the second body is formed from a compressible material.

A twelfth aspect of the present disclosure is to provide a pet toy according to any of the preceding aspects, wherein the groove is configured to compress the second body when the second body is disposed with the groove.

A thirteenth aspect of the present disclosure is to provide a pet toy according to any of the preceding aspects, wherein the second body has a first inner diameter, the first inner diameter being defined when the second body is in a relaxed state and being less than an outermost diameter of the first body, and the second body being configured to be stretched so as to increase the first inner diameter to a second inner diameter, the second inner diameter enabling the second body to traverse the outmost diameter and be positioned within the groove.

A fourteenth aspect of the present disclosure is to provide a pet toy according to any of the preceding aspects, wherein the groove is arcuate and opens in a radial direction.

A fifteenth aspect of the present disclosure is to provide method of manufacturing a pet toy, the method comprising molding a first ring section comprising a first body with an outer peripheral surface and a connector, the first body being rigid and including a groove, and connecting a second ring section comprising a second body to the first ring section by the connector, the second body being at least partially elastic and sized and configured to be removably positioned within at least a portion of the groove.

A sixteenth aspect of the present disclosure is to provide a pet toy according to any of the preceding aspects, wherein the molding a first ring section includes forming the connector of the first ring section to enable the second ring section to be at least partially removed from the groove while being connected to the first ring section.

A seventeenth aspect of the present disclosure is to provide a pet toy according to any of the preceding aspects, wherein the molding a first ring section includes molding the first body and the connector such that connector is integral with the first body and forms a through passage for the second body.

An eighteenth aspect of the present disclosure is to provide a pet toy according to any of the preceding aspects, wherein the second body has a first inner diameter, the first inner diameter being defined when the second body is in a relaxed state and being less than an outermost diameter of the first body, and the second body being configured to be stretched so as to increase the first inner diameter to a second inner diameter, the second inner diameter enabling the second body to traverse the outmost diameter and be positioned within the groove.

As can be understood, the embodiments described herein enable users to vary the style of play with their pets in a variety of ways. As can be understood, in one embodiment, the first and second ring sections can be co-axial or sheathed and the user can roll the pet toy in a sheathed or compact or closed configuration on the ground. In this embodiment, the user can also use a thrower such as the CHUCKIT! ® brand ball launcher or another comparable launcher to fling or launch the present invention potentially further than the invention can roll without such a launcher. In another embodiment, the first and second ring sections can be at least partially separated so as to be non-coaxial or unsheathed. The unsheathed or expanded or open configuration enables this embodiment of the present invention to use both rings in a figure eight shape. The user and pet can push and pull on the pet toy to interact closely and engage in rougher play where the pet can attempt to wrest away the pet toy from the user and vice versa. Another play option available from the unsheathed configuration is allowing the pet to chew on the pet toy. In one embodiment, the pet can chew on either the portion made from a rubber-like material or a portion made of a rope material.

Accordingly, it is apparent that embodiments of the pet toy provide multiple play options, enabling retail stores to use their shelving and display space more efficiently. It is further apparent that the embodiments disclosed herein can also enable a user to replace multiple pet toys and have a single pet toy that has multiple ring sections that are customizable for increasing play options.

BRIEF DESCRIPTION OF THE DRAWINGS

The invention will be explained in more detail hereinafter with reference to the drawings.

FIG. 3 is a side view of the pet toy illustrated in FIG. 1;

FIG. 4 is an end view of the pet toy illustrated in FIG. 1;

DETAILED DESCRIPTION OF THE EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 5:
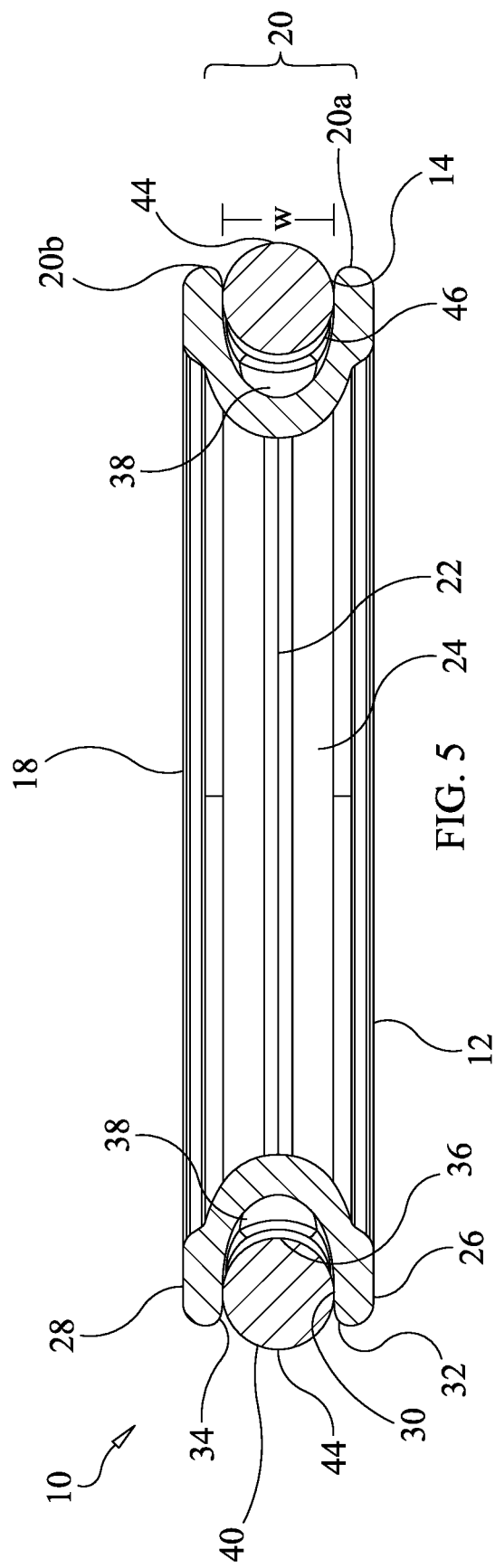
FIG. 5 is a cross sectional view of the pet toy illustrated in FIG. 1 taken along lines 5-5 of FIG. 2.
Figure 6:
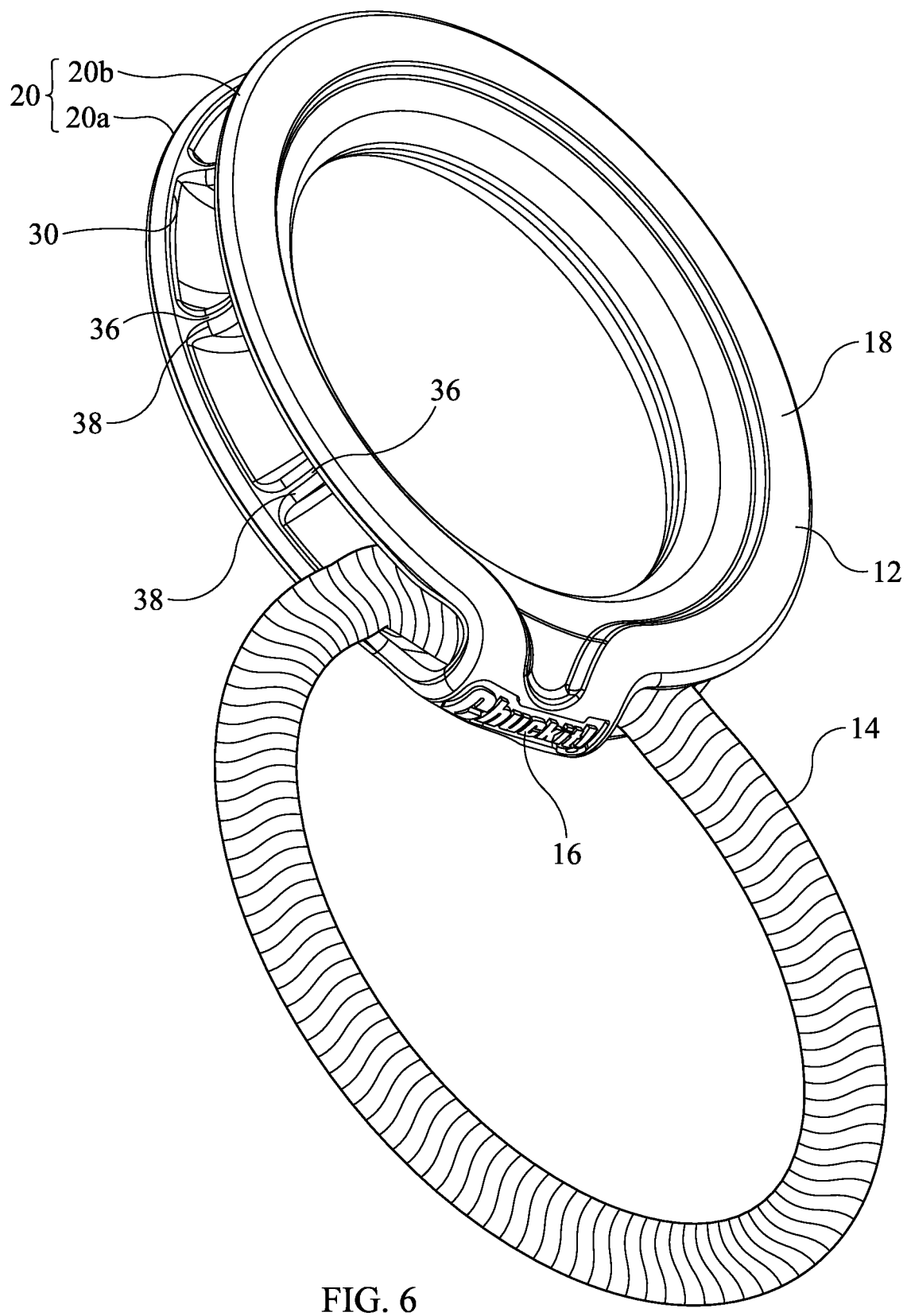
FIG. 6 is a perspective view of the pet toy illustrated in FIG. 1 in an unsheathed configuration.

Referring initially to FIGS. 1-7, a pet toy 10 is illustrated in accordance with an embodiment. The pet toy 10 includes a first ring section 12 and a second ring section 14. As illustrated in FIGS. 5 and 6, the first ring section 12 is connected to the second ring section 14 with a connector 16 and the second ring section 14 is movable relative to the first ring section 12.

The first ring section 12 is preferably formed form a molded plastic and/or rubber and includes a first body 18 with an outer peripheral surface 20 and the connector 16. The first body 18 and the connector 16 are preferably unitarily molded as a single piece, but can but connected together in any manner desired. In one embodiment, the first ring section 12 is a thermoplastic elastomer (TPE) that is molded into a substantially rigid member. However, the first ring section 12 can be formed in any manner desired.

The first body 18 is generally ring shaped (or toroidal) with an outer peripheral surface 20 defining an outer circumference and an opening 22 that is defined by an inner peripheral surface 24 (or an inner radial surface) defining an inner circumference. The inner peripheral surface 24 has an arcuate configuration and can be configured to couple to a throwing device TD, as discussed in more detail below. The inner peripheral surface 24 is continuous and is recessed relative to the first and second sides 26 and 28 of the first body 18.

That is as illustrated in FIG. 5, the first body 18 includes the first and second sides 26 and 28 that extend radially outwardly relative to the inner peripheral surface 24. The first and second sides 26 and 28 are generally straight and parallel to each other and terminate at the outer peripheral surface 20. In one embodiment, the first and second sides 26 and 28 can be arcuate such the outer surfaces of the first and second sides 26 and 28 continuously extend from the inner peripheral surface 24. Although the first and second sides 26 and 28 are preferably straight, the first and second sides 26 and 28 can have any suitable configuration.

As shown in FIGS. 3-6, a groove 30 is disposed at the outer peripheral surface 20, thus forming a first peripheral surface 20a and a second peripheral surface 20b. As can be understood, the groove 30 is formed by the inner surface 32 of the first side 26 and the inner surface 24 of the second side 28. The inner surface 32 of the first side 26 and the inner surface 24 of the second side 28 are preferably generally parallel and spaced apart so as to enable the second ring section 14 to be disposed therein. The groove 30 includes a bottom arcuate surface 36 between the inner surface 32 of the first side 26 and the inner surface 34 of the second side 28 such that the groove can have an arcuate configuration.

As shown in FIG. 5, the outer diameter of the groove 30 is substantially the same as inner diameter of the second body 40 when the second body is disposed within the groove 30. In one embodiment, the bottom arcuate surface 36 of the groove 30 can be formed by arcuate ribs 38 therein that abut the second ring section 14 when the second ring section 14 is disposed within the groove 30.

The first and second sides 26 and 28 are preferably formed so as to be somewhat flexible. That is, although the first ring section 12 is generally rigid, the first and second sides 26 and 28 have a length to width ratio that enables the sides to elastically flex inwardly and outwardly. Therefore, when the second ring section 14 is disposed within the groove 30, the first and second sides 26 and 28 are cable of flexing outwardly while maintaining an inward tension, such that the second ring section 14 is held within the groove 30 by a friction fit.

The second ring section 14 includes a second body 40 connected to the first body 18 by the connector 16. The second ring section 14 can be a braided rope or other flexible and compressible structure. That is, the second ring section 14 has a generally circular cross section and is at least partially elastic or pliable. The elasticity of the second ring section 14 enables the second ring section 14 to be stretched or have is configuration enabling second ring section 14 to be removed or positioned within the groove 30. Thus, the second ring section 14 is sized and configured to be removably positioned within at least a portion of the groove 30.

Figure 1:
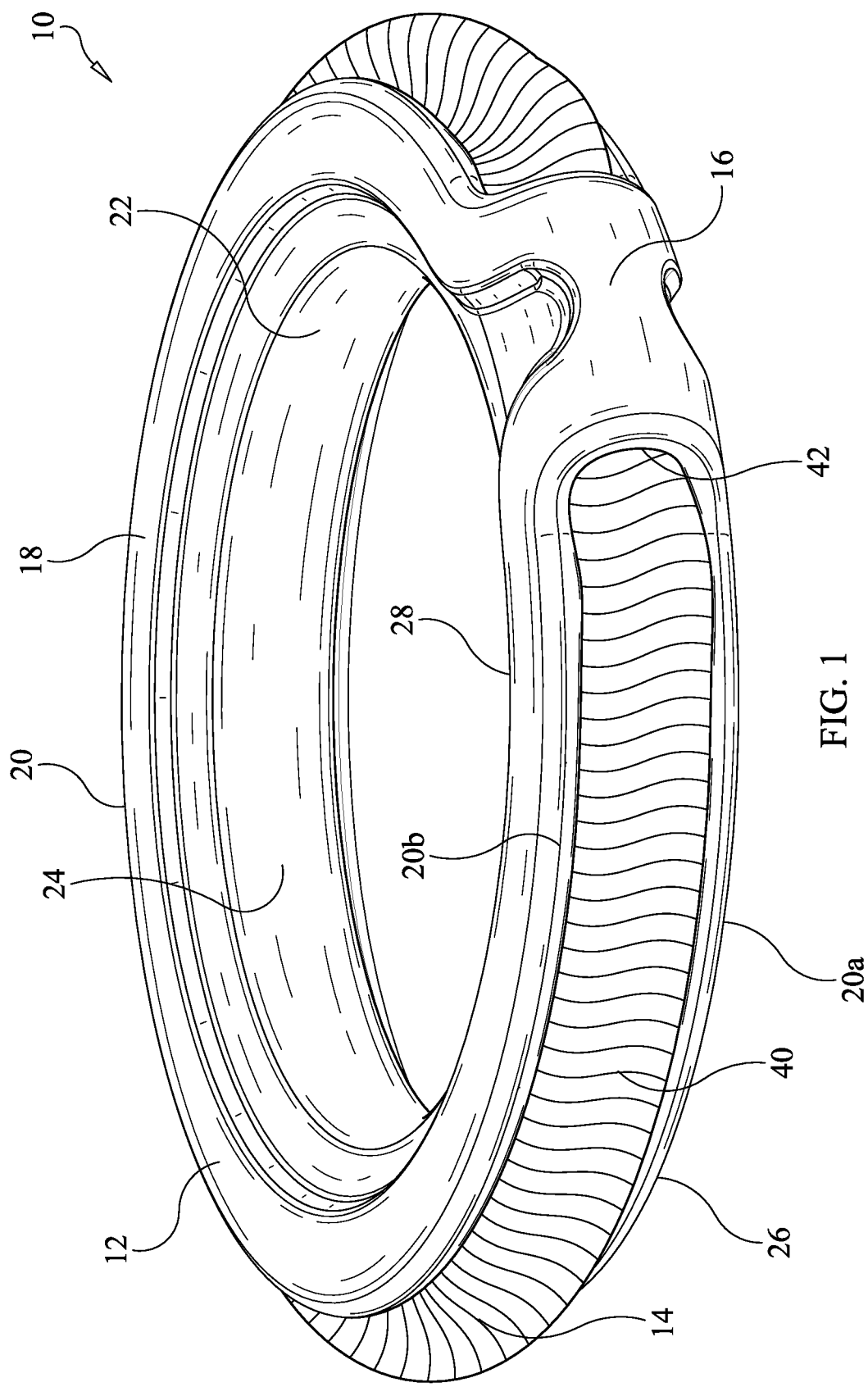
FIG. 1 is a top perspective view of a pet toy according to an embodiment of the present invention in a sheathed configuration.

As shown in FIG. 1, the connector 16 extends from the first peripheral surface 20a and a second peripheral surface 20b of the first and second sides 26 and 28 and forms a passage 42 therethrough. Thus, the groove 30 is formed by first and second sides 26 and 28, and the connector 16 is attached to the first and second sides 26 and 28. The passage 42 is generally circular or elliptical, but can have straight side portions formed by the inner surfaces 32 and 34 of the first and second sides 26 and 28. The passage 42 formed by the connector 16 can accept or hold the second ring section 14 without significantly changing the shape of the first ring section 12 or the groove 30 of the first ring section 12. Thus, in one embodiment, the connector 16 is integral with the first body 18 and forms the through passage 42 for the second body 14.

The first ring section 12 can be molded separately from the second ring section 14. Since the second ring section 14 can be a braided rope, the second ring section 14 can then be connected to the first ring section 12 by connecting the two ends of the braided rope in any manner desired. That is, prior to connecting the ends of the braided rope (i.e. the second ring section 14 together), the second body 40 can be passed through the passage 42 defined by the connector 16. The ends of the second body 40 can be coupled together to configure the second ring section 14 as a ring.

In another embodiment of the pet toy 10, the second ring section 14 can be bonded together by sewing or by using TPR or Thermo-Plastic-Rubber material or another bonding material.

As can be understood, the pet toy 10 can have a plurality of usable positions. One of the usable positions is the position in which the second ring section 14 is disposed within the groove 30 of the first ring section 12 (i.e., in a joined or sheathed position). In one embodiment, the second body 40 has a first inner diameter $D_1$, the first inner diameter $D_1$ can be defined when the second body 40 is in a relaxed state. See For example, FIGS. 6 and 7. The first inner diameter $D_1$ of the second body 40 is less than an outermost diameter $D_2$ of the first body 18. Therefore, to put the pet toy 10 in the sheathed position, the second body 40 can stretched so as to increase the first inner diameter $D_1$ to a second inner diameter that enables the second body 40 to traverse the outmost diameter and be positioned within the groove 30. Since the second body 40 is elastic or pliable, the second body 40 attempts to contract to the first inner diameter $D_1$ and is held within the groove 30.

As can be understood, since, in one embodiment, the second body 40 is braided rope, the braided rope enables the second body 40 to stretch and thus be pulled over one of the first peripheral surface 20a and a second peripheral surface 20b of the first and second sides 26 and 28 of the first ring section 12. The braided rope then contracts when disposed within the groove 30. Thus, the second body constricts such that the inner diameter of the second body 40 is at least $D_1$ (and can be greater than $D_1$) such that the second body 40 is held around the bottom arcuate surface 36 of the groove 30 by a tension fit.

Once in the groove 30, since the second body 40 is formed from not only a stretchable, but a compressible material, such as braided rope, when the pet toy 10 is in the sheathed position, the groove 30 is configured to compress the second body 40 of the second ring section 14. That is, the second body 40 is sized and configured to have a resting diameter $D_3$ (see FIG. 7) that is greater than the width W of the groove 30 (see FIG. 5). Thus, when the second body 40 is positioned within the groove 30, the second body 40 forces the first and second sides 26 and 28 apart. The first and second sides 26 and 28 are elastic and squeeze the second body 40 therebetween forming a friction fit.

It is noted that while a friction fit between the first and second sides 26 and 28 is discussed and a tension fit around the inner surface of the groove 30 is discussed, it can be sufficient for the pet toy 10 to have either one of these connections alone, together or any other connection desired when in the sheathed position. In one embodiment, the outer diameter of the groove 30 is substantially the same as the inner diameter of the second body 40 when the second body is disposed within the groove 30, such that the tension fit is minor, or the second body 40 is held within the groove 30 via only the friction fit between the first and second sides 26 and 28. In another embodiment, the outer diameter of the groove 30 is substantially larger than the inner diameter $D_1$ of the second body 40 when the second body is in a relaxed state, such that the second body 40 is held within the groove 30 via only the tension fit or both the tension fit and the friction fit between the first and second sides 26 and 28.

Figure 7:
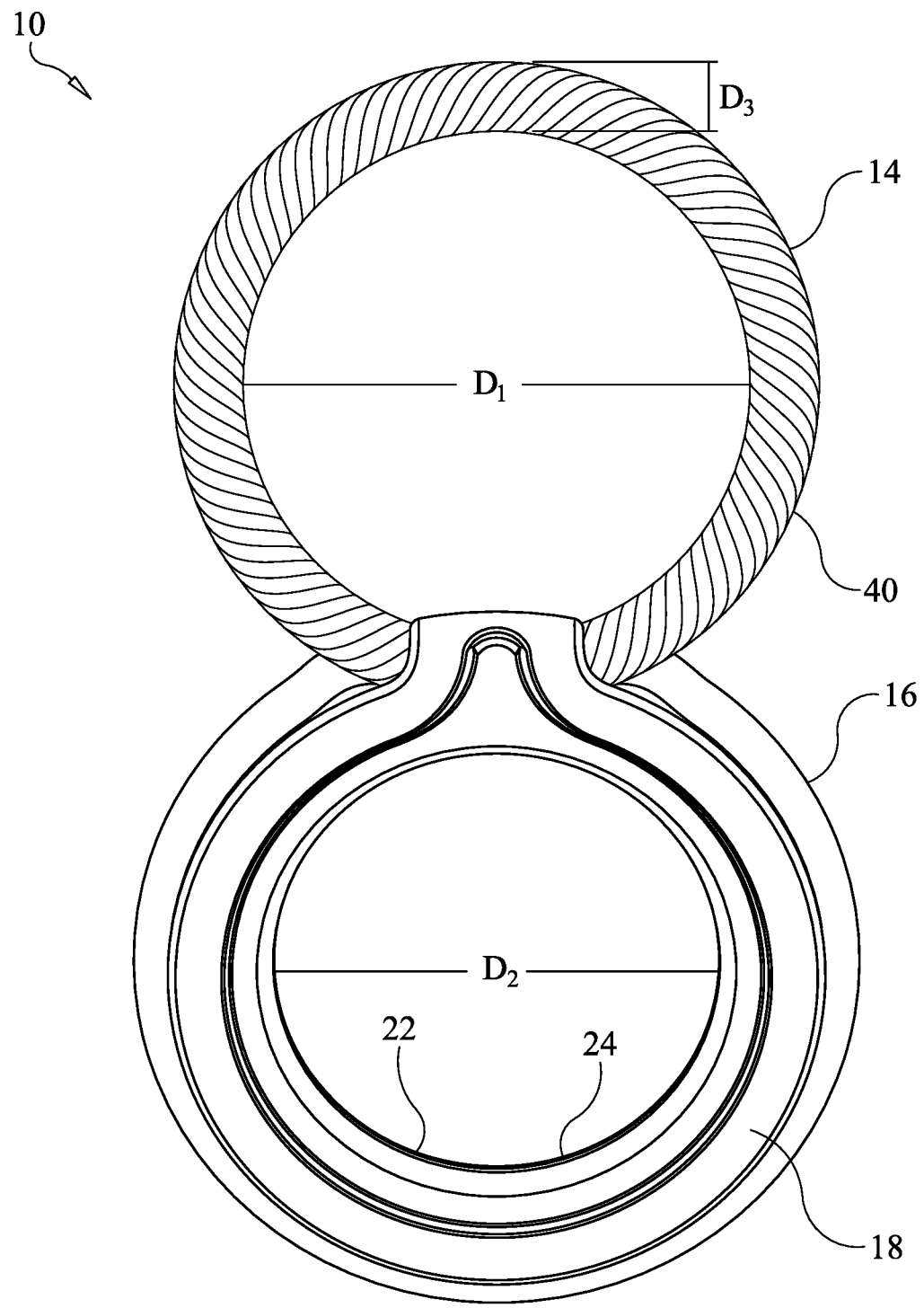
FIG. 7 is a top view of the pet toy illustrated in FIG. 1 in an unsheathed configuration.

The first and second ring sections 12 and 14 can be expanded or moved from the sheathed position by moving the second ring section 14 from the groove 30 (e.g., stretching the second ring section 14 over one of the first and second sides 26 and 28) to a separated position (i.e., an unsheathed position, as shown in FIGS. 6 and 7).

Figure 2:
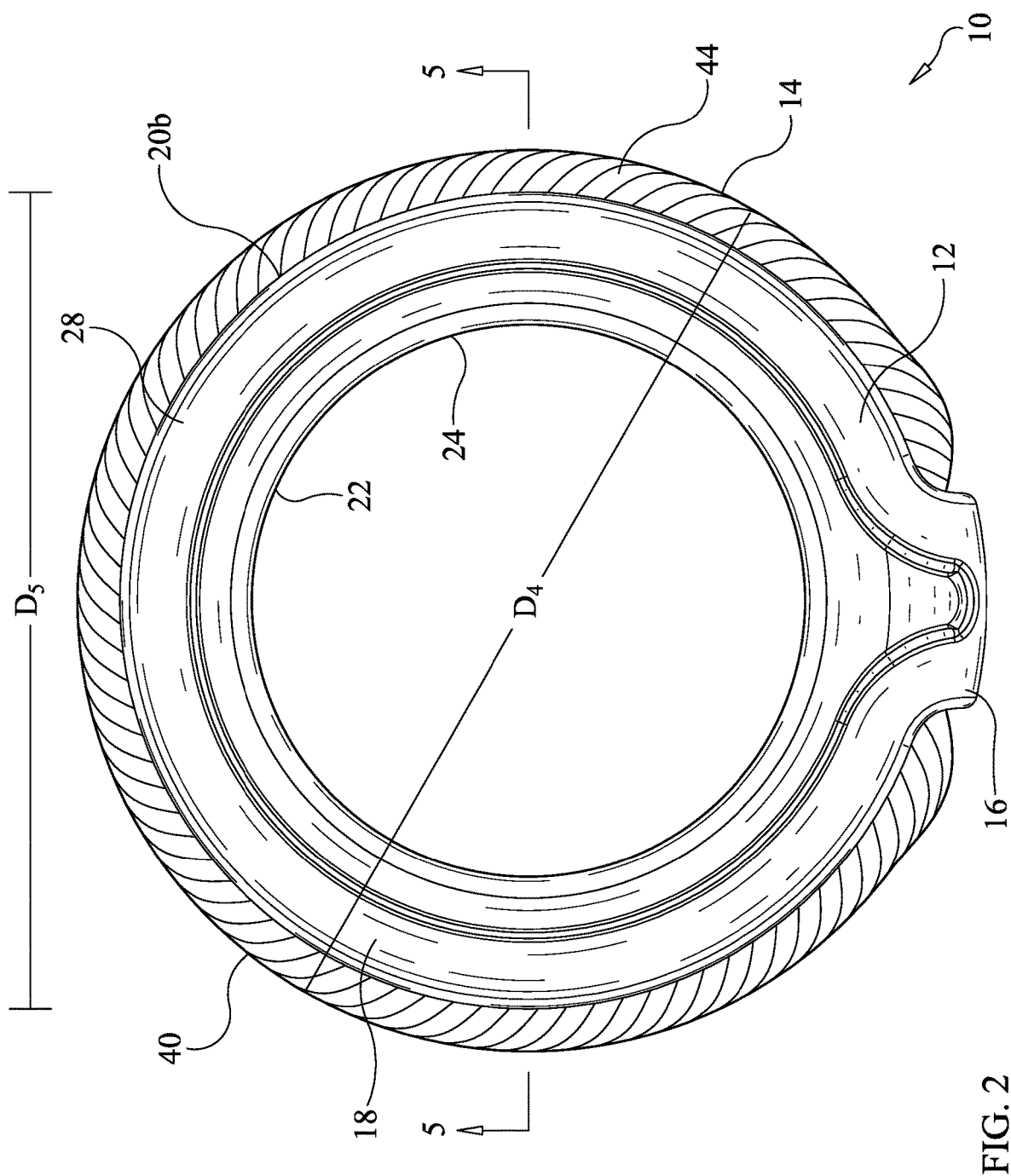
FIG. 2 is a top view of the pet toy illustrated in FIG. 1.

The sheathed position shown in FIGS. 1-4, comprises the second ring section 14 overlapping the first ring section 12. In this position, the second ring section 14 is at least partially disposed within the groove 30. As shown in FIG. 2, the second ring section 14 can have an outer diameter $D_4$ that is greater than the diameter $D_5$ of the outer peripheral surface 20 of the first ring section 12, such that the outer radial portion 44 of the second ring section 14 is disposed outside of the groove 30, while an inner radial portion 46 is disposed within the groove 30. See for example, FIG. 6.

The unsheathed position, as illustrated in FIGS. 6 and 7, shows that the second ring section 14 is movably connected at the connector 16 of the first ring section 12 and no longer fully overlapping the first ring section 12. That is, the connection between the first ring section 12 and the second ring section 14 enables the second ring section to freely rotate within the connector 16. Thus, the second ring section 14 can easily be moved or rotated to and from the sheathed position (FIGS. 1-4) to and from the unsheathed position (FIGS. 6 and 7). In the unsheathed position the second ring section 14 is at least partially removed (or completely removed) from the groove 30 while being connected to the first ring section 12 by the connector 16.

In one embodiment, the connector 16 of the first ring section 12 and the second ring section 14 can be configured to be permanently connected or configured to have both connected and unconnected positions or states. That is the connector 16 can be unitary (e.g., simultaneously molded) with the first ring section 12 or a portion can be separable from the first ring section 12. In one embodiment the connector 16 can have a separation (e.g., a slit) in the circumferential direction of the first ring section 12 that would enable the second ring section 14 to removed therethrough, these two portions of the connector 16, while generally rigid, can have a width and length ratio that enables elastic flexing of the connector 16 to enable the second ring section 14 to be removed.

In another embodiment, the connector 16 can be completely or partially removable from the first ring section 12.

Figure 8:
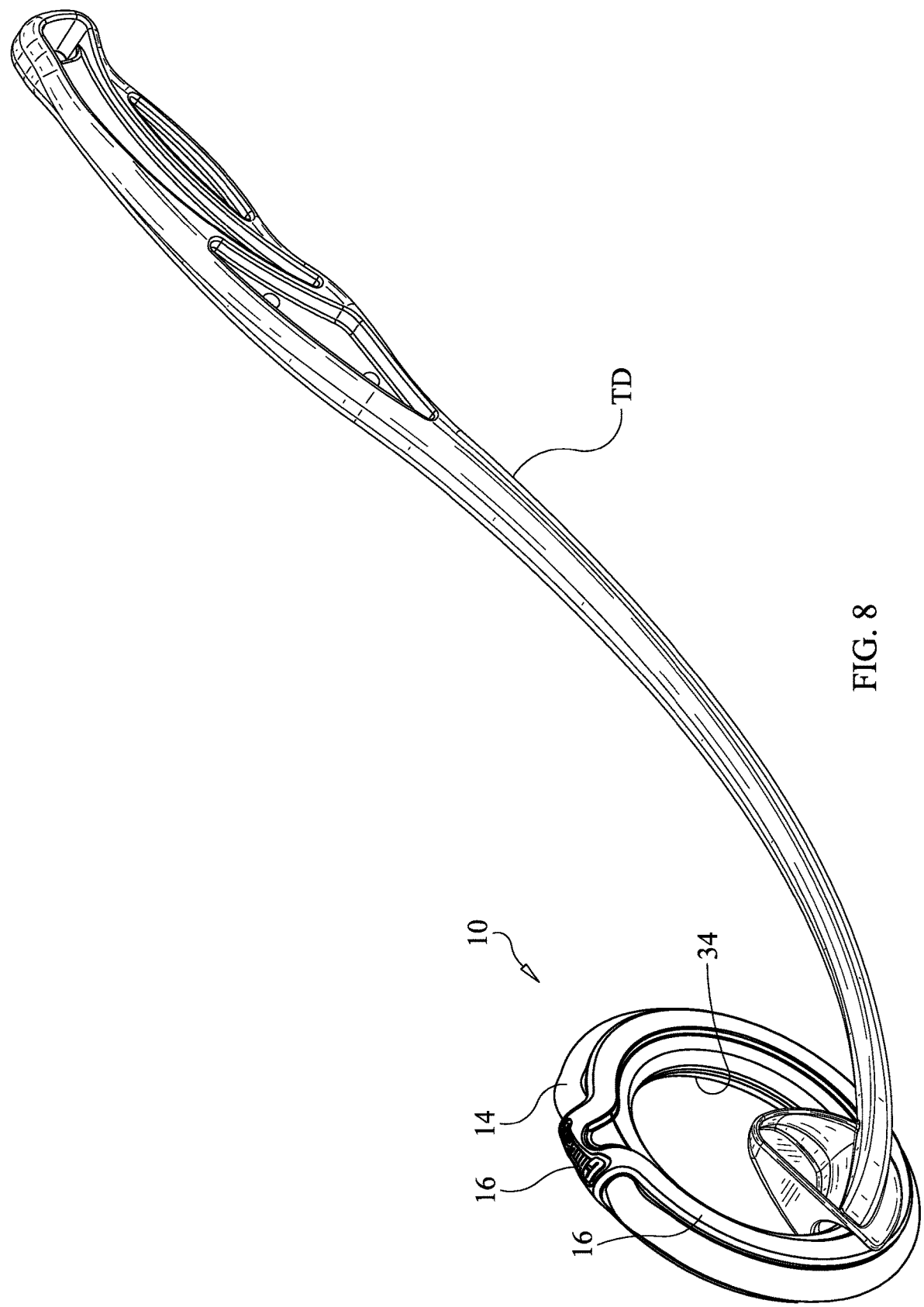
FIG. 8 is a perspective view of the pet toy in a launcher.
Figure 9A:
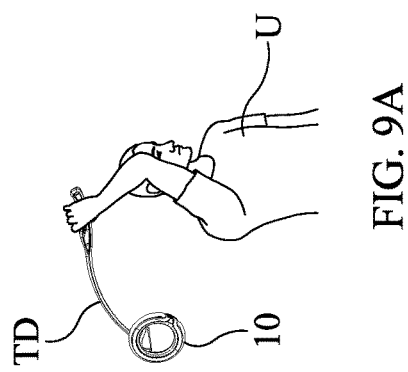
FIGS. 9A and 9B show the pet toy illustrated in FIG. 1 used in play.
Figure 9B:
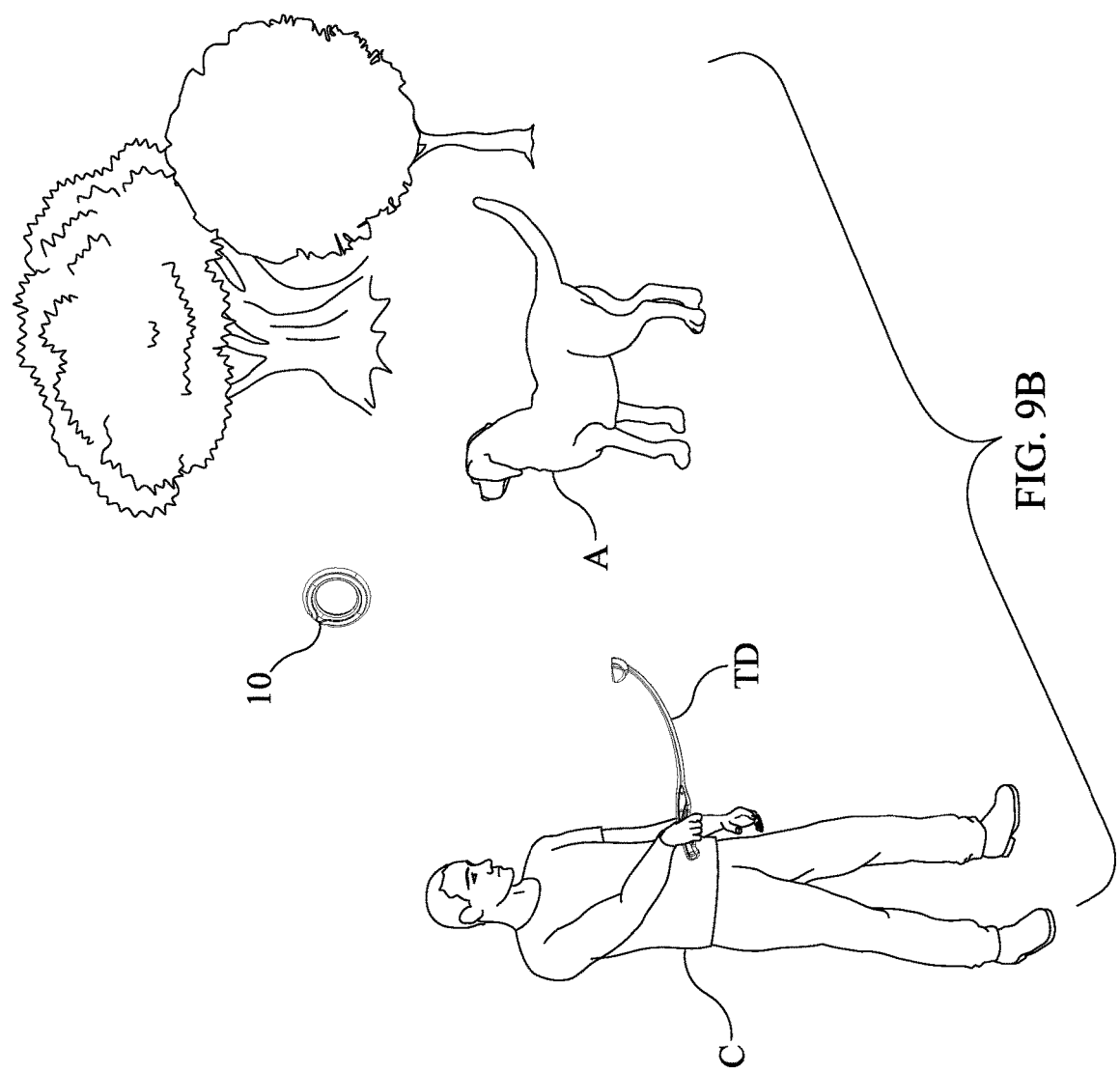

FIG. 8 shows the pet toy 10 connected to a launcher or throwing device TD. In this embodiment, the throwing device TD can couple to the inner peripheral surface 24 of the first ring section 12. Such a connection enables the user U to launch the toy 10 at a distance far greater than without the throwing device TD. As shown in FIGS. 9A and 9b, a user U playing with a pet P with an embodiment of the pet toy 10 can use the throwing device TD to launch the pet toy 10. Moreover, the toy 10 is configured to enable the throwing device TD to pick up the toy 10 with using hands to enable the user U to avoid dirt or animal slobber on the toy 10.

In forming the pet toy 10 described herein, one process can include molding the first ring section 12 such that the first ring section includes the first body 18 with the outer peripheral surface 20 and the connector 16. As described above, since the first body 18 can be formed TPE, in this embodiment the first body 18 is rigid and includes a groove 30. Then the second ring section 14 can be formed by forming a braided rope comprising a second body 40. The second body 40 can be connected to the first body 18 of the first ring section 12 by the connector 16. In this embodiment, since the second body 40 is a braided rope, the second body 40 is at least partially elastic. Moreover, when forming the second body 40, it is sized and configured to be removably positioned within at least a portion of the groove 30.

The molding of the first ring section 12 can include forming the connector 16 to enable the second ring section 14 to be at least partially removed from the groove 30 while being connected to the first ring section 12. Additionally, the molding of the first ring section 12 can include molding the first body 18 and the connector 16 such that connector 16 is integral with the first body 18 and forms the through passage 42 for the second body 40.

It is apparent that embodiments of the pet toy 10 described herein provide multiple play options, enabling retail stores to use their shelving and display space more efficiently. It is further apparent that the embodiments disclosed herein can also enable a user U to replace multiple pet toys and have a single pet toy that has multiple ring sections that are customizable for increasing play options.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed:

1. A pet toy comprising:
   a first ring section comprising a first body with an outer peripheral surface, and a connector, the first body being rigid and including a circumferential groove extending along substantially the entirety of the outer peripheral surface; and
   a second ring section comprising a second body connected to the first body by the connector, the second body being at least partially elastic and sized and configured to be removably positioned within at least a portion of the circumferential groove, the second ring section having a first end, a second end and a main body, the first and second ends being connected to the first ring section at the connector, the main body being movable relative to the first ring section, the connector being integrally formed with the first ring section such that the first and second ends of the second ring section are partially disposed within the circumferential groove.

2. The pet toy according to claim 1, wherein the first body has a toroidal shape.

3. The pet toy according to claim 1, wherein the connector of the first ring section is configured to enable the second ring section to be at least partially removed from the circumferential groove while being connected to the first ring section.

4. The pet toy according to claim 1, wherein the second body is formed from a rope so as to be pliable.

5. The pet toy according to claim 1, wherein the connector is integral with the first body and forms a through passage for the second body.

6. The pet toy according to claim 5, wherein the circumferential groove is formed by first and second sides, and the connector is attached to the first and second sides.

7. The pet toy according to claim 1, wherein the first body includes an inner radial surface configured to couple to a throwing device.

8. The pet toy according to claim 7, wherein the inner radial surface is arcuate.

9. The pet toy according to claim 1, wherein
an outer diameter of the circumferential groove is substantially the same as an inner diameter of the second body.

10. The pet toy according to claim 1, wherein
the second body is configured to be held in the circumferential groove by a friction fit.

11. The pet toy according to claim 1, wherein
the second body is formed from a compressible material.

12. The pet toy according to claim 11, wherein
the groove is configured to compress the second body when the second body is disposed with the circumferential groove.

13. The pet toy according to claim 1, wherein
the second body has a first inner diameter, the first inner diameter being defined when the second body is in a relaxed state and being less than an outermost diameter of the first body, and the second body being configured to be stretched so as to increase the first inner diameter to a second inner diameter, the second inner diameter enabling the second body to traverse the outmost diameter and be positioned within the circumferential groove.

14. The pet toy according to claim 1, wherein
the circumferential groove opens in a radial direction.

15. A method of manufacturing a pet toy, the method comprising:
molding a first ring section comprising a first body with an outer peripheral surface and a connector, the first body being rigid and including a circumferential groove extending along substantially the entirety of the outer peripheral surface; and
connecting a second ring section comprising a second body to the first ring section by the connector, the second body being at least partially elastic and sized and configured to be removably positioned within at least a portion of the circumferential groove, the second ring section having a first end, a second end and a main body, the first and second ends being connected to the first ring section at the connector, the main body being movable relative to the first ring section, the connector being integrally formed with the first ring section such that the first and second ends of the second ring section are partially disposed within the circumferential groove.

16. The method of claim 15, wherein
the molding a first ring section includes forming the connector of the first ring section to enable the second ring section to be at least partially removed from the circumferential groove while being connected to the first ring section.

17. The method of claim 15, wherein
the molding a first ring section includes molding the first body and the connector such that connector is integral with the first body and forms a through passage for the second body.

18. The method of claim 15, wherein
the second body has a first inner diameter, the first inner diameter being defined when the second body is in a relaxed state and being less than an outermost diameter of the first body, and the second body being configured to be stretched so as to increase the first inner diameter to a second inner diameter, the second inner diameter enabling the second body to traverse the outmost diameter and be positioned within the circumferential groove.

* * * * *